United States Patent Office.

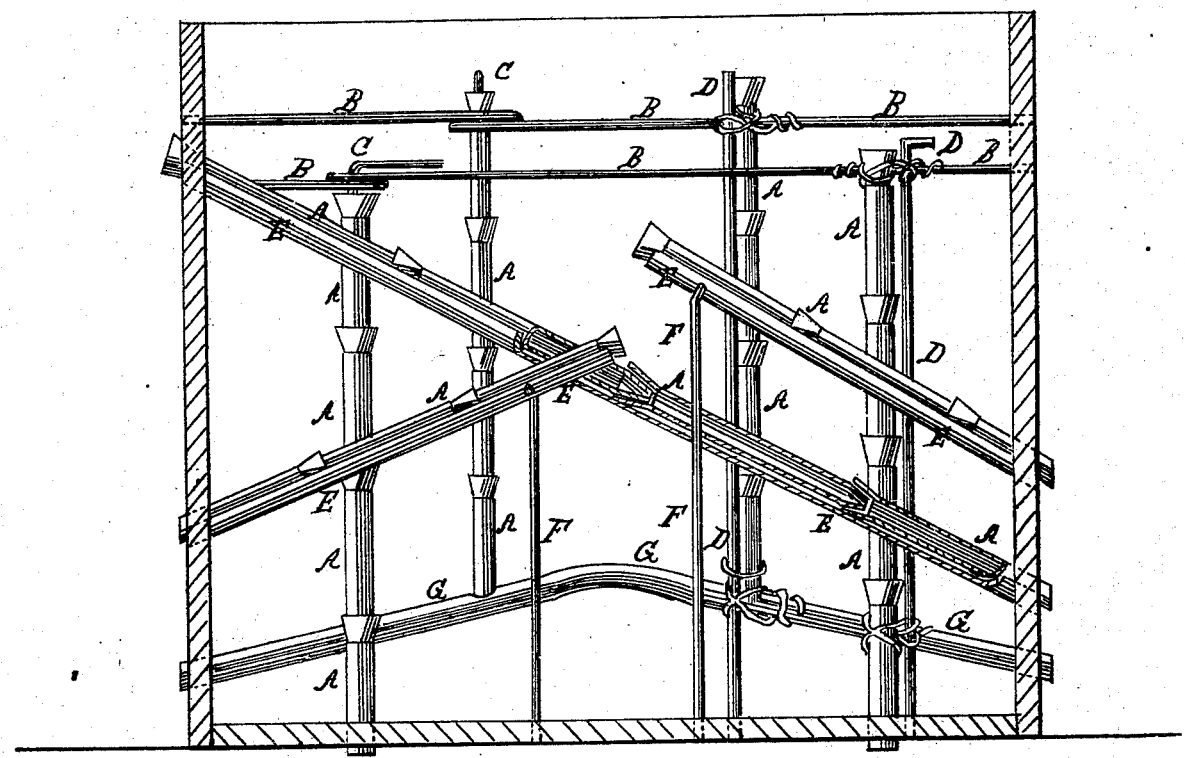

JARVIS ROYAL, OF ROCHELLE, ILLINOIS.

Letters Patent No. 74,149, dated February 4, 1868.

IMPROVED DRYING AND VENTILATING-APPARATUS.

The Schedule referred to in these Letters Patent and making part of the same.

TO ALL WHOM IT MAY CONCERN:

Be it known that I, JARVIS ROYAL, of Rochelle, in the county of Ogle, and State of Illinois, have invented a new and useful Improvement in Drying and Ventilating-Apparatus; and I do hereby declare that the following is a full, clear, and exact description thereof, which will enable others skilled in the art to make and use the same, reference being had to the accompanying drawings, forming part of this specification, in which the figure is a vertical section of a bin illustrating different ways of arranging my improved apparatus.

My invention has for its object to furnish an improved means for drying and ventilating damp grain, fish, and other things stored in bins, holds of vessels, and other places; and it consists in the introduction of porous tubes into the bin, hold of a vessel, or other place in which the article to be dried and ventilated is stored, for the purpose of absorbing the moisture and conducting it away, and at the same time introducing cold air into and through the mass.

A are the pipes, which I prefer to make of unglazed earthenware, but any equivalent porous material, which will absorb the moisture and conduct it away, may be employed. The pipes or tubes A can be made in sections, and be connected together by making the lower end of each section smaller, and the upper end larger than the body of the pipe, so that the smaller end of the one section may be inserted in the larger end of another section, as shown in the drawing, or ordinary draining-tiles may be used. The pipes A may pass up vertically through the bin or other place to be dried and ventilated, their lower ends being connected with holes in the bottom of the bin or with discharge-pipes passing through the lower part of said bin; or the pipes or tubes A may be set in an inclined position, their lower ends passing out through holes in the sides or ends of said bin, near its bottom. The vertical pipes A may be secured in position by having their upper ends secured to horizontal bars or rods, B, passing through the bin, and by vertical supporting-rods, C, passing vertically through the pipes, or by vertical supporting-rods, D, passing down at the side of said porous pipes A. When the porous pipes or tubes A pass through the bin in an inclined position, they may be supported by shallow spouts or troughs, E, in which said pipes are laid, said spouts or troughs being supported by brace or supporting-rods, F, at suitable distances apart, as shown in the drawing. G are discharge-pipes, passing through the lower part of the bin, at such an inclination as will carry off the moisture discharged into them from the porous pipes A. The pipes G may be porous or not, as may be desired.

This invention may be used for drying and ventilating damp grain or other substances stored in bulk in bins, canal-boats, vessels, railroad-cars, and storehouses. It may also be used in fishing-vessels, enabling the fish to be packed in bulk without being previously dried, the porous pipes absorbing the moisture and conducting it away, so that the fish may be dried during the voyage. The said pipes also serve to introduce cold or fresh air into and through the mass being dried, so as to thoroughly ventilate it. In the case of vessels, the water may be discharged into the lower part of the hold, from which it may be pumped in the same manner as bilge-water.

I claim as new, and desire to secure by Letters Patent—

The tubes A, arranged within a bin or other place in which grain or other substance is to be dried, when such tubes are composed of earthen or other equivalent porous material that will absorb the moisture from the substance being dried, as herein set forth for the purpose specified.

JARVIS ROYAL.

Witnesses:
A. R. FRY,
A. S. HOADLEY.